I. D. MATHEWS.

Journal-Boxes.

No. 5,892. Reissued May 26, 1874.

*Witnesses.*
C. F. Brown
Dr. F. Ellsworth

*Inventor*
*I. D. Mathews.*
*by his Attys.*
Wm. F. Ellsworth

AM. PHOTO-LITHOGRAPHIC CO. N. Y. (OSBORNE'S PROCESS.)

UNITED STATES PATENT OFFICE.

ISAAC D. MATHEWS, OF WORCESTER, MASSACHUSETTS, ASSIGNOR TO SIMEON S. COOK.

IMPROVEMENT IN JOURNAL-BOXES.

Specification forming part of Letters Patent No. 76,092, dated March 31, 1868; reissue No. 5,892, dated May 26, 1864; application filed March 21, 1874.

*To all whom it may concern:*

Be it known that I, ISAAC D. MATHEWS, of the city and county of Worcester and Commonwealth of Massachusetts, have invented certain new and useful Improvements in Journal-Boxes; and I do hereby declare that the following is a full, clear, and exact description of the same, reference being had to the accompanying drawings forming a part of this specification, in which—

Figure 1:
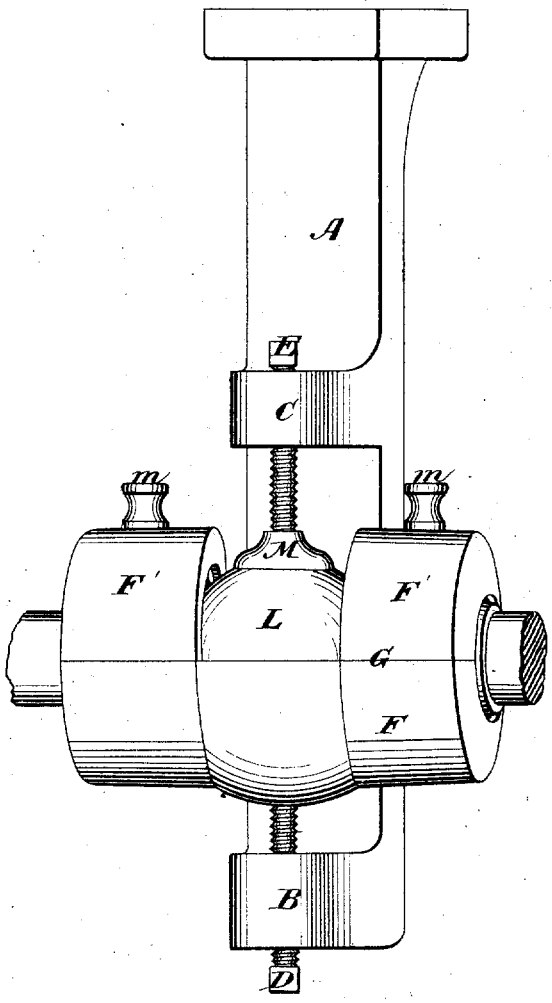
Figure 2:
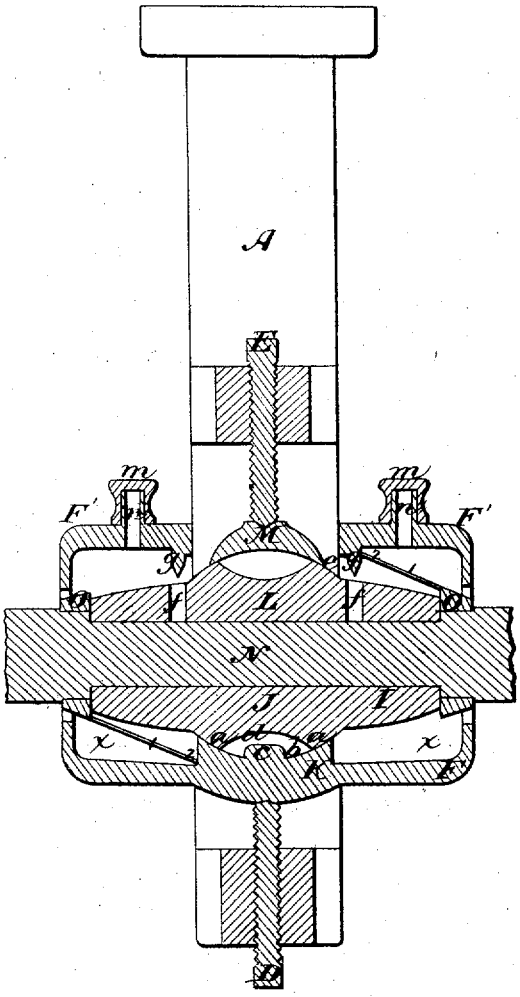

Figure 1 represents a perspective view of one of my improved journal-boxes as it appears when applied to use, and Fig. 2 represents a vertical central section of the box and shaft.

To enable those skilled in the art to which my invention belongs to make and use the same, I will proceed to describe it more in detail.

In the drawings, A is the hanger, having two projections, B and C, in which are the adjusting-bolts D E, which help to support and retain the outer shell F of the journal-box G in place. Within the shell F is an inner box, I, the lower half J of which has a rounded projection, *a*, which rests and turns in a concavity, *b*, in the bottom K of the shell F. The latter has a projection, *c*, which enters a recess, *d*, in the part *a*. The upper half L of the inner box I is retained in proper position by the cap M, which fits over the rounded projection *e* of the part L. Two oil-holes, *f f*, are made in the part L, while the two pointed projections *g g* upon the under sides of the two end caps F′ F′ of the shell F point directly into the tops of the oil-holes *f f*. The shaft N may be turned down to receive the inner box I, as shown in the drawings, if preferred. Beveled collars O O are placed upon the shaft within the shell F, as shown in the drawings. Wires or pieces of metal 1 1, or other suitable material, are fastened to the collars O O, so as to project into the space between the box I and shell F, as indicated in the drawings.

The operation is as follows: A quantity of oil or lubricating substance is turned into the shell F, which runs into the bottom of the shell F, from which it is brought up by the ends of the wire 1 1, and as these wires strike against the points *g g* the oil or lubricating substance is scraped off and dropped from the points *g g* into the holes *f f*, and passes down to lubricate the bearing parts of the shaft and box. The collars O O prevent the oil from running out upon the shaft beyond the shell F.

The collars O O may be made with a shell to extend up over the ends of the box I, to take up and throw the oil upon the points *g g*, or drop it into the holes *f f*. The edges of the collars O O, when thus extended, may have bristles, or some fibrous substance, or small yielding wire points attached thereto, to deliver the oil to the pins *g g*. The wires 1 1 are made so as to draw against the points *g g*, whereby the oil is scraped off. This is effected by inclining their ends 2 2 back of the points of their attachment to the collars O O.

It will be seen that the box I can turn freely to conform to the positions of the shaft as it revolves, whereby all binding of the parts is obviated.

The shell part F is bolted to the hanger A, the bolt being passed through a slot in the hanger, so that the shell can be set up or down.

The shell F may be applied to a stationary box or bearing with good results, the shaft being provided with the collars and oiling apparatus, substantially as above described.

The invention is equally applicable to shafts which have no bearings turned down, as shown in the drawings.

*m m* are caps, which cover the oil-holes *n n*, to prevent the entrance of dust or dirt.

Having described my improved journal box or bearing, what I claim therein as new and of my invention, and desire to secure by Letters Patent, is—

1. The lubricating apparatus herein described, consisting essentially of the wheel or collar O, provided with oil-raising projections 1 1 on its inner face, the reservoir *x x*, and chambers or oil-holes *f f*, substantially as set forth.

2. The inner boxes J L, provided with the rounded projections *a e*, in combination with the shell F, having the concavity *b*, and cap M, substantially as described, and for the purpose set forth.

3. The combination, with the shell F′ and the points or projections *g g*, of the collars O O and oilers 1 1, substantially as and for the purposes set forth.

4. The combination of the points *g g* with the caps F′ F′ and the boxes J L, substantially as and for the purposes set forth.

5. The combination of the oilers 1 1 with the collars O O, as described, whereby they draw against the points or projections *g g*, which scrape the oil from the oilers, as set forth.

6. The combination of the shell F and caps F′ F′ with the collars O O and oilers 1 1, and shaft N, substantially as and for the purposes set forth.

ISAAC D. MATHEWS.

Witnesses:
JOSEPH WHITAKER,
EDWIN L. MATHEWS.